United Sta[tes Patent]

Souhaité

[11] 4,117,394
[45] Sep. 26, 1978

[54] WELL LOGGING APPARATUS WITH PAD-MOUNTED VERTICAL ELECTRODE ARRAY FOR MEASURING THE RESISTIVITY OF THE FLUSHED ZONE

[75] Inventor: Philippe Souhaité, Paris, France

[73] Assignee: Schlumberger Technology Corporation, New York, N.Y.

[21] Appl. No.: 805,241

[22] Filed: Jun. 10, 1977

[51] Int. Cl.$^2$ .............................................. G01V 3/18
[52] U.S. Cl. ...................................................... 324/10
[58] Field of Search ........................................ 324/10

[56] References Cited
U.S. PATENT DOCUMENTS

| | | | |
|---|---|---|---|
| 2,669,690 | 2/1954 | Doll | 324/10 |
| 2,712,630 | 7/1955 | Doll | 324/10 X |
| 2,712,631 | 7/1955 | Ferre | 304/10 X |
| 2,750,557 | 6/1956 | Bricaud | 324/10 |
| 2,876,413 | 3/1959 | Saurenman et al. | 324/10 |
| 3,060,373 | 10/1962 | Doll | 324/10 X |
| 3,798,535 | 3/1974 | Schuster | 324/10 |

*Primary Examiner*—Gerard R. Strecker

[57] ABSTRACT

In accordance with an illustrative embodiment of the present invention, a well logging apparatus uses a narrow wall-engaging pad equipped with an array of long vertical electrodes. The width of the pad is between 2 and 4 inches, and the length-to-width ratio of the array is between 3 and 5. Circuits are connected to the electrodes for propagating a focused current primarily through the zone of the adjacent formation likely to be flushed by the borehole fluid. This current and the associated potential difference are measured to produce a signal representative of the resistivity of the flushed zone.

4 Claims, 2 Drawing Figures

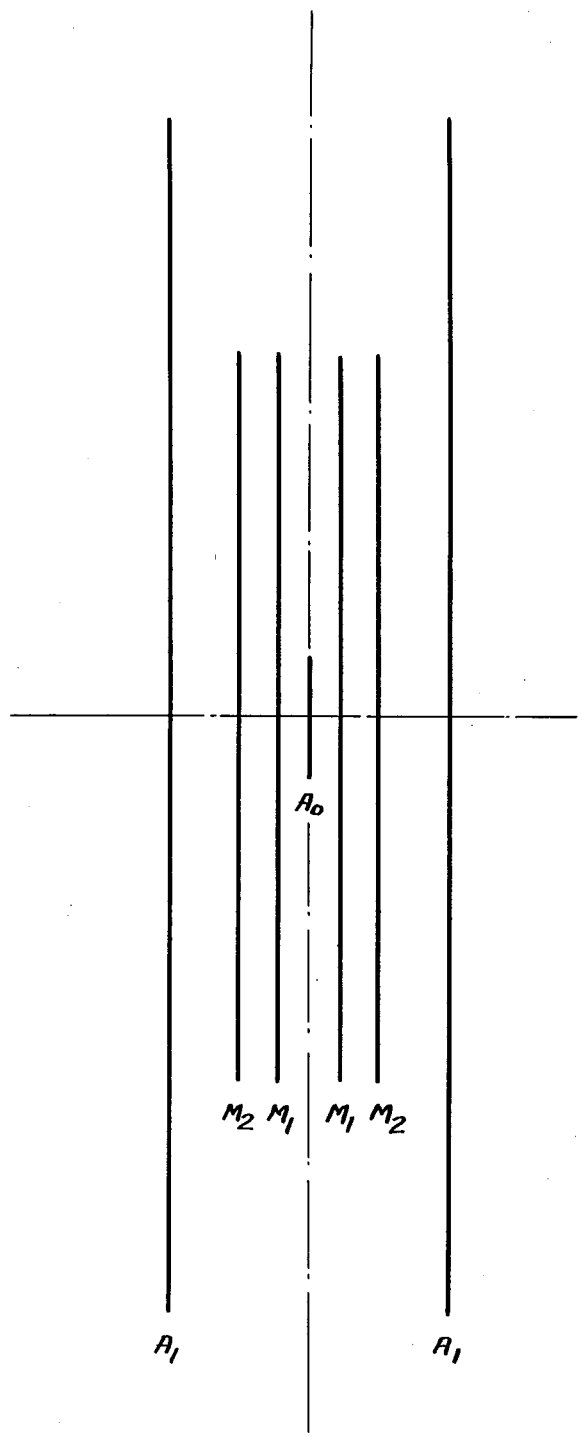

WELL LOGGING APPARATUS WITH PAD-MOUNTED VERTICAL ELECTRODE ARRAY FOR MEASURING THE RESISTIVITY OF THE FLUSHED ZONE

BACKGROUND OF THE INVENTION

The present invention relates to well logging apparatus for investigating subsurface formations traversed by a borehole and, more particularly, to apparatus using pad-mounted electrode systems whose active parts operate in the immediate proximity of the borehole walls. Such pad systems are particularly useful in determining the resistivity $R_{xo}$ of the zone near the borehole likely to be washed by the filtrate of the borehole fluid, better known as the flushed zone.

Various apparatus have been proposed to determine the resistivity of the flushed zone. One of the most commonly used at the present time, referred to as "microspherical focusing system", is described in U.S. Pat. No. 3,798,535, granted on Mar. 19, 1974 to N. A. Schuster. In this system, an array of concentrical rectangular electrodes is mounted on a wide pad sufficiently pliable to conform to the curvature of the borehole wall. A survey current emitted by the central electrode is forced, by appropriately adjusted focusing currents, to flow directly into the formation where it bells out and returns to a remote electrode. The ratio of the potential difference between two potential electrodes to the survey current gives a measurement of the resistivity of a formation zone very close to the borehole wall, which measurement is only slightly influenced by the mudcake resistivity.

The resistivity measurement obtained using this technique is generally good in boreholes which do not present excessive caving and for low contrasts between the resistivity of the mudcake and the resistivity of the flushed zone. However, abnormally low resistivity readings are sometimes obtained in very high contrasts and poor hole conditions. The main reason for such erroneous response has been found to be the poor contact between the borehole wall and such a wide pad. A better application of the pad would require excessively great application forces. Moreover, even if it were possible, by exerting very high application forces, to maintain under most conditions a good contact with the wall, the deformation of the pad would affect the response of the system in an indeterminate manner.

Fast wear is another shortcoming of the present pad. Since the pad must have good flexibility, it is usually made of an elastomer, such as neoprene, which is not rugged enough to withstand repeated friction with the borehole wall. As a consequence, some pads cannot stand more than three or four trips in a well.

The above-discussed problems may be overcome by the use of a narrow rigid pad which can be applied against the borehole wall with higher pressures and, since elastomer is not longer needed, has a good resistance to wear. Unfortunately, a substantial reduction of the width of the present electrode array would result in an excessive reduction of the depth of investigation, making the system almost insensitive to the resistivity of the flushed zone but responsive practically only to the mudcake resistivity.

Thus, it is an object of the present invention to provide a resistivity well logging apparatus using a narrow pad-mounted electrode array capable of measuring the resistivity $R_{xo}$ of the flushed zone.

SUMMARY OF THE INVENTION

In accordance with the invention, an apparatus for investigating the earth formations traversed by a borehole comprises an elongated support member adapted to movement through the borehole and a wall-engaging pad member carried by the support member and adapted to be pressed against the borehole wall. The wall-engaging face of the pad member is equipped with an array of linear electrodes which are substantially parallel to the longitudinal axis of the support member and spaced apart along a direction substantially perpendicular to said axis. Circuits are connected to the electrodes for propagating a focused current primarily through the zone of the adjacent formation likely to be washed by the borehole fluid. This current and the associated potential difference are measured to produce a signal representive of the resistivity of the zone traversed by the measured current.

The use of electrodes parallel to the longitudinal axis of the support member makes it possible to have, on a narrow pad, a narrow array of long electrodes. These long electrodes not only contribute to improve the relatively poor focusing in a direction perpendicular to the axis (that is due to the reduced electrode spacings), but also insure themselves, without the help of a special circuit, a certain degree of focusing in a direction parallel to the axis. As a result, the array of the present invention has, in spite of its narrowness, a depth of investigation which is sufficient to obtain a good sensitivity to the resistivity $R_{xo}$ of the flushed zone.

The width of the pad member is preferably comprised between approximately 2 and 4 inches. The length-to-width ratio of the electrode array is between 3 and 5. The electrode array comprises a central electrode and three pairs of electrodes respectively short circuited and symmetrically located with respect to the central electrode at respective distances from said electrode.

For a better understanding of the present invention, together with further objects and advantages thereof, reference may be made to the following description and to the accompanying drawings.

BRIEF DESCRIPTION OF THE DRAWINGS

FIG. 2 shows an alternative embodiment of the electrode array mounted on the pad member of FIG. 1.

DESCRIPTION OF THE PREFERRED EMBODIMENT

Figure 1:
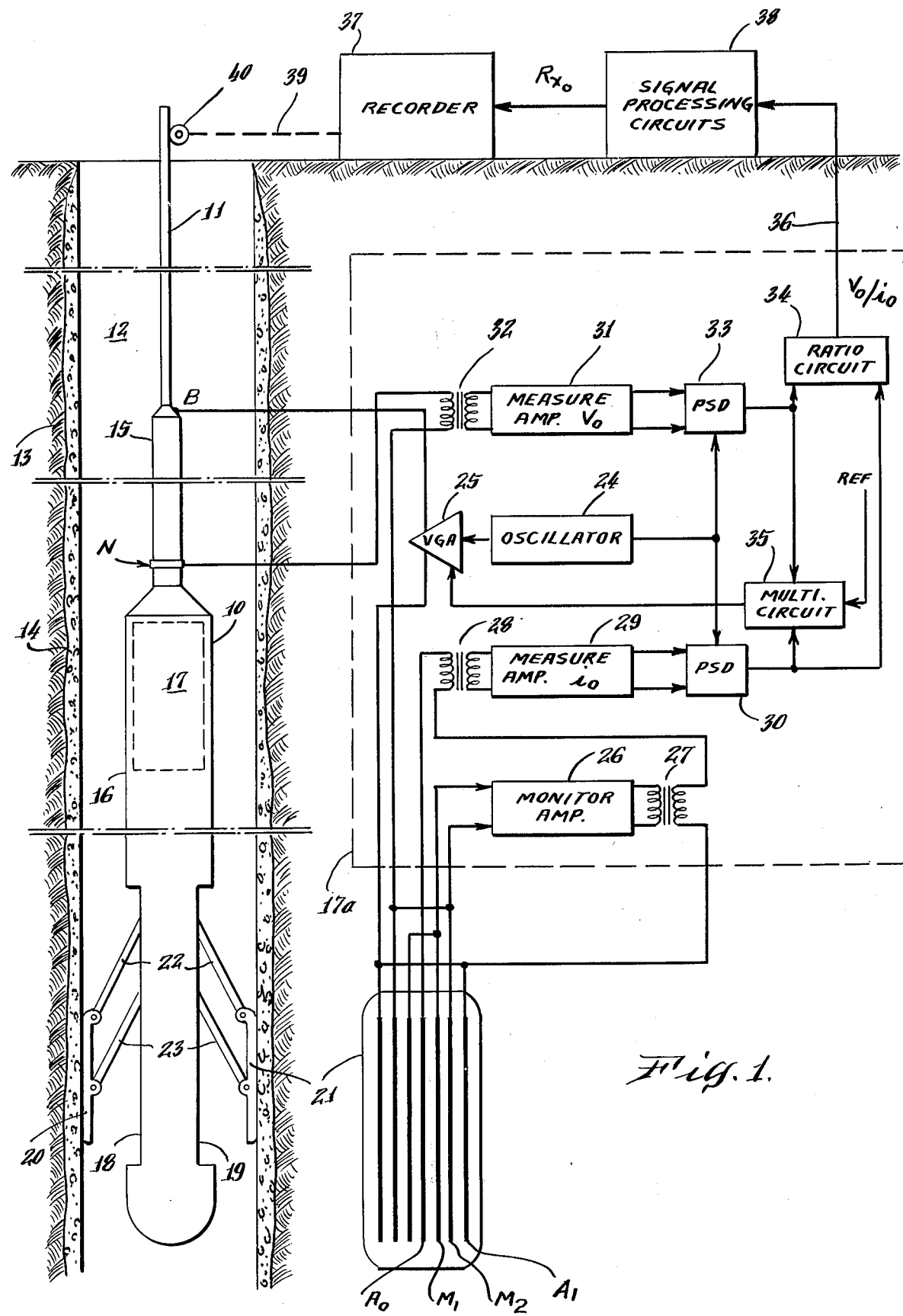
FIG. 1 illustrates a pad-mounted apparatus according to the invention.

Referring to FIG. 1, an apparatus 10 according to the invention is shown suspended at the end of an armored cable 11 in a borehole 12 traversing earth formations 13. The borehole has a mudcake 14 formed along the wall thereof. The lower end of the cable is covered with a suitable insulating material 15 that comprises a remote reference electrode N.

The apparatus 10 comprises an elongated support member 16 whose upper part contains circuits 17 which will be described later and whose lower part comprises two longitudinal grooves 18 and 19 into which may fit two pads 20 and 21 respectively. Each pad is connectd to support member 16 by two arms 22 and 23 which are articulated on the pad at one end and on the support member at the other end. These articulated arms are actuated by a conventional hydraulic system (not shown) to either retract the pads in their respective grooves or press them against the borehole wall with a selected force.

Pad 21 is a narrow rigid measuring pad equipped with an array of electrodes emitting a survey current which is forced by focusing currents to propagate primarily in the zone of the formation likely to be flushed by the borehole fluid. Typically, the pad has a width comprised between 2 and 4 inches. Such a pad, because of its narrowness, can obviously be applied against the borehole wall with higher pressures than a wider pad. A better contact of the electrodes with the wll can thus be achieved. Moreover, as the pad no longer has to be flexible, it can be made of metal and use hard insulating material for the necessary insulation of the electrodes. As a result, the pad has an excellent resistance to wear.

With a conventional array of horizontal electrodes on such a narrow pad, it would be very difficult, because of the reduced length of the electrodes, to achieve a satisfactory focusing of the survey current and therefore obtain an acceptable mudcake effect. This problem is overcome by the use of an array of linear strip-like electrodes which are parallel to the longitudinal axis of the support member and spaced apart along a direction perpendicular to the axis. These vertical electrodes are made long enough not only to improve the relatively poor horizontal focusing resulting from the reduced electrode spacings, but also to insure themselves, without the help of a special circuit, a certain degree of vertical focusing. The array thus becomes sufficiently 37 deep", in spite of its narrowness, to be primarily sensitive to the resistivity $R_{xo}$ of the flushed zone.

Typically, a satisfactory focusing (that is, a good sensitivity to $R_{xo}$ and a low mudcake sensitivity) can be obtained with an electrode array whose length-to-width ratio is between 3 and 5. Thus, with a 3-inch wide pad, allowing an electrode array having a width of about 2.5 inches, the electrodes will have a length comprised approximately between 7.5 and 12.5 inches.

A typical example of an electrode array is shown in FIG. 1 to the right of pad 21. The array includes a central electrode $A_o$ and three pairs of electrodes $M_1$, $M_2$, $A_1$ symmetrically located with respect to $A_o$ at respective increasing distances $d_1 d_2 d_3$ from the central electrode. The electrodes of each pair are electrically short-circuited. Typically, $d_1$, $d_2$ and $d_3$ respectively have the values 0.26 inch, 0.60 inch and 1.20 inch. The electrodes have an approximate length of 10 inches.

The electrodes of pad 21 are connnected to circuits 17 contained in the upper part of the support member 16 and which are shown, for greater clarity, in the dotted line box 17a. An oscillator 24 supplies, through a variable gain amplifier (VGA) 25, an alternating current $i_1$ between the outer current electrodes $A_1$ and a remote current return electrode B at the junction between the insulated and armored portions of cable 11. The potential difference between the electrodes $M_1$ and $M_2$ is sensed by a monitor amplifier 26 whose output transformer 27 is connected between the central current electrode $A_o$ and the outer current electrodes $A_1$. The basic role of monitor amplifier 26 is to maintain a substantially zero potential gradient between $M_1$ and $M_2$. Consequently, the current $i_o$ emitted by the central electrode $A_o$ is prevented from propagating in the adjacent mudcake but forced to return to the pad following a path traversing the formation. Due to the short spacing between the central electrode $A_o$ and the outer electrodes $A_1$, the current $i_o$, called the survey current, propagates primarily in the zone of the formation very close to the borehole wall likely to be washed by the borehole fluid. Consequently, by measuring the survey current $i_o$ and the associated potential difference $V_o$, the resistivity $R_{xo}$ of the flushed zone can be determined.

For that purpose, the current produced by monitor amplifier 26 passes through the input transformer 28 of a measure amplifier 29. The output signal from this amplifier is supplied to a phase-sensitive detector (PSD) 30 which derives its phase reference signal from oscillator 24 and generates a DC output signal representative of the survey current $i_o$. A second measure amplifier 31 is responsive to the potential difference, as developed across the secondary winding of its input transformer 32, between the remote reference electrode N and a point where monitor amplifier 26 maintains a substantially zero gradient, such as the electrodes $M_2$. The output signal from amplifier 31 is compared with a phase reference signal from oscillator 24 in a phase-sensitive detector 33 to produce a DC output signal representative of the potential difference $V_o$.

The $V_o$ signal from detector 33, as well as the $i_o$ signal from detector 30, are combined in a ratio circuit 34 which operates to produce a signal $V_o/i_o$ proportional to the resistivity $R_{xo}$ of the flushed zone.

In addition, the $V_o$ and $i_o$ signals are supplied to a multiplication circuit 35 which produces an error signal representative of the difference between the product $V_o \cdot i_o$ and a reference value REF. This error signal then controls the gain of amplifier 25 acting on the amplitude of the alternating current supplied to the electrodes so as to maintain the product $V_o \cdot i_o$ constant. This arrangement, shown in greater detail in U.S. Pat. No. 3,539,910, issued to L. Henry et al. on Nov. 10, 1970, ensures operation of the system at constant power, which reduces the dynamic range of the measurement signals and thus guarantees good accuracy of measurement on a wide range of resistivity values.

The resistivity signal $R_{xo}$ is supplied to the surface through a conductor 36 (which is reality is in cable 11) to a trace recorder 37 via suitable signal processing circuits 38. Recorder 37 is driven as a function of cable movement by a shaft 39 coupled to a rotating wheel 40 engaging the cable. The resistivity signal $R_{xo}$ is thus recorded as a function of borehole depth.

In the array shown in FIG. 1, all the electrodes have the same length. As a result, the focusing in the lower and uppermost parts of the array may not be as effective as in the center of the pad. FIG. 2 illustrates how the electrode array of FIG. 1 can be modified to improve the focusing and thus reduce the mudcake effect. As can be seen in FIG. 2, the improved array includes, as the array of FIG. 1, a central electrode $A_o$ and three pairs of electrodes $M_1$, $M_2$, $A_1$ symmetrically located with respect to $A_o$ at respective increasing distances from the central electrode. The electrode spacings are substantially the same as those of the array of FIG. 1.

The array of FIG. 2 differs from the array of FIG. 1 in that the electrodes now have different lengths. More particularly, the central electrode $A_o$ is made substantially shorter than the pair of outer electrodes $A_1$, whereas the two pairs of monitoring electrodes $M_1$, $M_2$ have the same length, comprised between the lengths of $A_o$ and $A_1$. All the electrodes have their center on the same horizontal axis which is perpendicular to the sonde axis. Such long outer electrodes provide a much stronger focusing of the survey current emitted by the short central electrode $A_o$.

Typically, the length of the outer electrodes is approximately between three and five times greater than the width of the array, that is, comprised between 7.5 and 12.5 inches. A substantial reduction of the mudcake effect is obtained when the outer electrodes $A_1$ are approximately eight to 12 times longer than the central electrode $A_o$ and the monitoring electrodes $M_1$, $M_2$ approximately five to seven times longer than the same electrode. Thus, for example, with the same 3-inch-wide pad and 10-inch-long outer electrodes $A_1$, the central electrode will be 1 inch long and the monitoring electrodes $M_1$, $M_2$ 6 inches long.

It is to be understood that the above-described electrode array could also be used in a reciprocal configuration wherein the functions of the current electrodes and the monitoring electrodes are reversed. An example of how an electrode system can be reciprocated is set forth in U.S. Pat. No. 2,712,631 granted to M. C. Ferre on July 5, 1955.

While there have been described what at present considered to be preferred embodiments of this invention, it will be obvious to those skilled in the art that various changes and modifications may be made therein without departing from the invention, and it is therefore intended to cover all such changes and modifications as fall within the true spirit and scope of the invention.

I claim:

1. An apparatus for investigating earth formations traversed by a borehole, comprising:
    an elongated support member adapted for movement through the borehole;
    a wall-engaging rigid pad member carried by said support member and adapted to be urged against the borehole wall;
    a plurality of electrodes, at least some of them being linear and mounted on the borehole wall-engaging face of said pad member substantially parallel to the longitudinal axis of said support member and spaced apart along a direction substantially perpendicular to said axis, to form a long narrow array whose dimension in a direction perpendicular to the axis is less than 4 inches and whose dimension in a direction parallel to said axis is substantially three to five times greater than its dimension in a direction perpendicular to the axis;
    first circuit means connected to said electrodes for propagating between two electrodes of the pad a survey current primary through the zone of the formation likely to be washed by the borehole fluid; and
    second circuit means for measuring said survey current and the potential difference between a remote reference electrode and a point lying between said two electrodes to produce a signal representative of the resistivity of said zone.

2. The apparatus of claim 1, wherein the electrodes mounted on said pad member comprise a central electrode and first, second and third pairs of electrodes respectively short-circuited and symmetrically located with respect to the central electrode at respective increasing distances from said central electrode.

3. The apparatus of claim 2, wherein said first circuit means includes:
    means for supplying current between the electrodes of said third pair and a remote electrode; and
    means responsive to the potential difference between the electrodes of said first and second pair for supplying said survey current between the central electrode and the electrodes of said third pair so as to maintain said potential difference substantially equal to zero.

4. The apparatus of claim 3, further comprising:
    means for producing an error signal representative of the difference between a reference value and the product of said survey current and said potential difference measured by said second circuit means; and
    means responsive to said error signal for controlling the current supplied between the electrodes of the third pair and the remote electrode so as to keep said product constant.

* * * * *

UNITED STATES PATENT AND TRADEMARK OFFICE
CERTIFICATE OF CORRECTION

PATENT NO. : 4,117,394
DATED : Sept. 26, 1978
INVENTOR(S) : Philippe Souhaité

It is certified that error appears in the above-identified patent and that said Letters Patent are hereby corrected as shown below:

Col. 2, line 8 change "to" to - - for - -.

Col. 3, line 13 change "wll" to - - wall - -.

Col. 4, line 42 change "is" first occurrence to -- in --.

Signed and Sealed this

Twenty-eighth Day of August 1979

[SEAL]

Attest:

LUTRELLE F. PARKER
*Attesting Officer*     *Acting Commissioner of Patents and Trademarks*